(12) United States Patent
Henderson et al.

(10) Patent No.: US 11,408,802 B2
(45) Date of Patent: Aug. 9, 2022

(54) BURNER-BASED EXHAUST REPLICATION SYSTEM WITH RAPID EXCHANGE OF EXHAUST AFTERTREATMENT DEVICES

(71) Applicant: Southwest Research Institute, San Antonio, TX (US)

(72) Inventors: Robert Henderson, San Antonio, TX (US); Bryan Zavala, San Antonio, TX (US); Scott T Eakle, San Antonio, TX (US); Cary Henry, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 46 days.

(21) Appl. No.: 17/125,726

(22) Filed: Dec. 17, 2020

(65) Prior Publication Data
US 2022/0196519 A1    Jun. 23, 2022

(51) Int. Cl.
*G01M 15/10* (2006.01)
(52) U.S. Cl.
CPC ................................ *G01M 15/102* (2013.01)

(58) Field of Classification Search
CPC ........................... G01M 15/10; G01M 15/102
See application file for complete search history.

(56) References Cited

U.S. PATENT DOCUMENTS

| | | | |
|---|---|---|---|
| 4,602,507 A * | 7/1986 | Hayes | G01M 15/106 73/114.06 |
| 2017/0130849 A1* | 5/2017 | Demitroff | F16K 11/07 |
| 2018/0334943 A1* | 11/2018 | Eakle | F01N 9/002 |
| 2022/0074358 A1* | 3/2022 | Briggs, Jr. | C25B 9/00 |
| 2022/0082469 A1* | 3/2022 | Furuse | G01F 5/005 |

* cited by examiner

*Primary Examiner* — Eric S. McCall
(74) *Attorney, Agent, or Firm* — Livingston Law Firm

(57) ABSTRACT

A burner-based exhaust replication system that includes mechanisms for rapidly exchanging exhaust aftertreatment devices for testing. The exhaust replication system has a test leg for delivering exhaust to an exhaust aftertreatment device and a bypass leg for bypassing exhaust around the test leg. The test leg is equipped with a rotating drum that holds a number of exhaust aftertreatment devices. The drum is rotatable to selectively align the aftertreatment devices with the test leg and is moveable laterally in a direction parallel to the test leg to aid in sealing the test leg to the aftertreatment device.

7 Claims, 2 Drawing Sheets

BURNER-BASED EXHAUST REPLICATION SYSTEM WITH RAPID EXCHANGE OF EXHAUST AFTERTREATMENT DEVICES

TECHNICAL FIELD OF THE INVENTION

This invention relates to exhaust replication systems, such as systems for testing automotive exhaust aftertreatment devices, and more particularly to methods and systems for rapidly exchanging the exhaust aftertreatment devices for testing.

BACKGROUND OF THE INVENTION

In today's automotive vehicles, exhaust aftertreatment devices remove potentially harmful gases and particulates from the engines' exhaust. Examples of these are the catalytic converters common on gasoline vehicles as well as diesel oxidation catalysts, diesel particulate filters, and selective catalytic reduction catalysts.

The desire for reduced automotive emissions has led to the need for test systems that rapidly and cost-effectively evaluate and age exhaust aftertreatment devices. This allows both performance and durability to be tested.

Conventionally, tests of exhaust aftertreatment devices have been conducted on engine test stands. However, burner-based systems are also used. An example of a burner-based system is the Exhaust Component Transient Operation Laboratory (ECTO-Lab™) developed by Southwest Research Institute and described U.S. Pat. No. 7,140,874 issued Nov. 28, 2006, entitled "Method and Apparatus for Testing Catalytic Converter Durability" and in U.S. Pat. No. 7,412,335 issued Aug. 12, 2008, entitled "Component Evaluations Using Non-Engine Based Test System".

An ongoing challenge in the exhaust aftertreatment device industry is rapid certification of such devices prior to or after use in the field. Production level devices must be screened for potential problems that inhibit their performance.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to methods and systems for replicating automotive exhaust gas in a burner-based test system. The burner-based test system is equipped with a rapid exchange appendage so that aftertreatment devices can be quickly installed and exchanged for testing.

This fulfills a need for a testing system that can accept production aftertreatment devices and quickly assess their activity.

For purposes of example, the rapid exchange methods are described in the context of use with a burner-based ECTO-Lab test system developed by Southwest Research Institute. As described in the Background, the ECTO-Lab test system is for aftertreatment device testing, accommodating full-sized catalysts from light-duty gasoline engines to large, heavy-duty diesel and natural gas engines. It is a multi-fueled, burner-based system designed to replicate exhaust conditions generated by internal combustion engines. The ECTO-Lab system can simulate and provide a continuous flow of exhaust gas conditions using gasoline, diesel, natural gas, or propane fuels. It meets testing requirements for a wide range of full-size aftertreatment catalysts and devices.

However, the invention may be used with any continuous flow burner-based system that replicates exhaust of internal combustion engines for the purposes of testing exhaust aftertreatment devices. The exhaust gas is generated through model-based controls and may contain various combinations of mass flow rate, temperature, and exhaust gas composition. The exhaust gas composition may include components such as oxygen nitrides, water, oxygen, particulate matter, and hydrocarbons.

Figure 1:
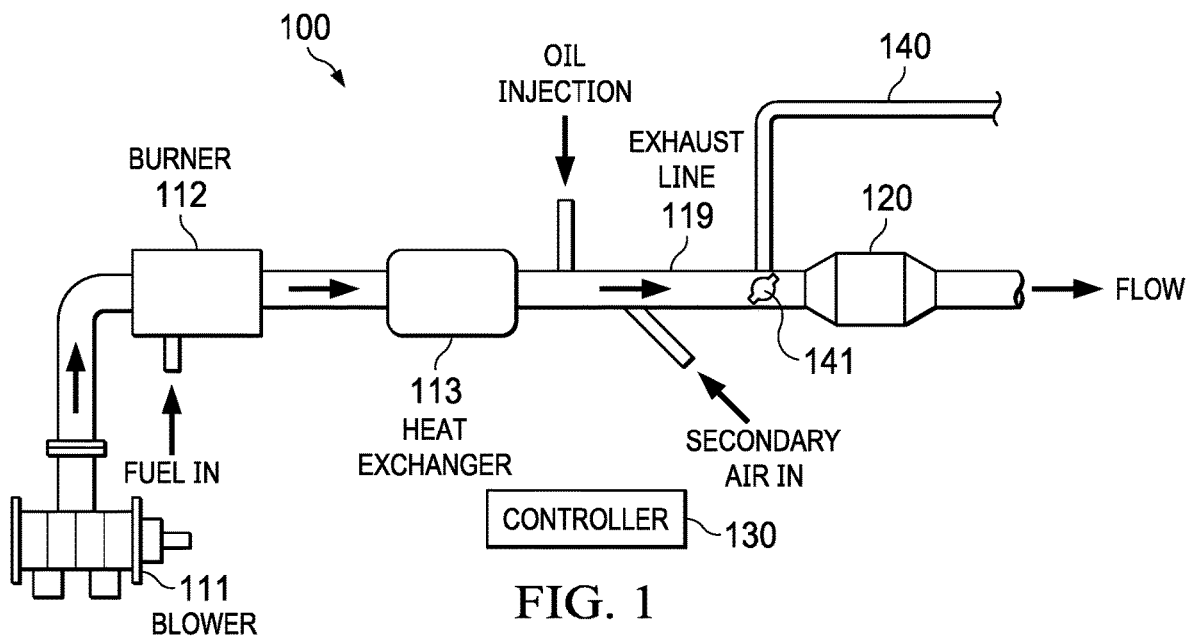
FIG. 1 illustrates a burner-based test system for testing automotive exhaust aftertreatment devices.

FIG. 1 illustrates a burner-based exhaust replication test system 100 suitable for use with the present invention. Exhaust gas conditions are generated through computer control and allow various combinations of flow, temperature, and exhaust component concentrations. As stated above, an example of such a system is the ECTO-Lab™ system.

A burner 112 combusts a hydrocarbon fuel, such as gasoline or natural gas, thereby producing an exhaust stream. A wide range of air-fuel ratios may be combusted. A blower 111 is used to produce a desired air flow into burner 112.

A heat exchanger 113 allows the exhaust gas temperature to be controlled. Other temperature control means are possible, such as the addition of dilution gas. A typical range of outlet temperatures for system 100 is 400 to 1200 degrees centigrade.

An exhaust line 119 delivers the exhaust to an exhaust aftertreatment device 120 that is being tested. Examples of aftertreatment devices tested with system 100 are selective reduction catalysts, diesel oxidation catalysts, diesel particulate filters, three-way catalysts, and methane oxidation catalysts.

An oil injector optionally allows oil to injected into the exhaust line 119. This feature of system 100 is significant for aging various aftertreatment devices. A secondary air injector optionally allows an amount of fresh air to be injected into the exhaust line 119.

A controller 130 allows system 100 to implement programmable aging cycles. Parameters affecting the exhaust flow and content, such as exhaust temperature, flow rate, combustion air-fuel ratio, secondary air injection, and oil injection, may be varied. Although not shown in FIG. 1, system 100 has appropriate valves, injectors, and other mechanisms for achieving these controls.

Controller 130 may incorporate the various control features described below, or those features may be implemented with separate controllers.

A bypass leg 140 allows exhaust gas to bypass the aftertreatment device 120. A valve 141 is used to determine whether exhaust gas shall be routed through the aftertreatment device 120 or through the bypass leg 140.

Most systems 100 have a modular design, which allows components to be added to the base burner and heat exchanger. The system 100 can be modified as desired to simulate multi-fuel engines, as well as to replicate full transient exhaust traces.

Figure 2:
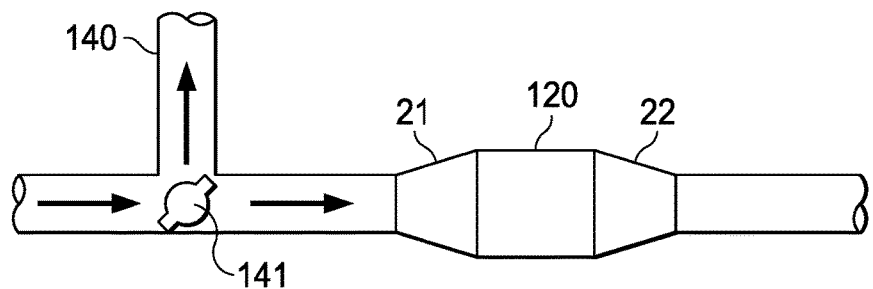
FIG. 2 illustrates the test leg of the test system.

FIG. 2 illustrates a portion of a burner-based test system such as the one of FIG. 1, specifically, the portion in which the exhaust aftertreatment device 120 is installed for testing. As illustrated in both FIGS. 1 and 2, the device 120 is installed downstream of valve 141. This portion of the burner-based system 100 is referred to herein as the "test leg" of the system. Typically, the test leg comprises a round pipe through which exhaust travels to the aftertreatment device 120.

While device 120 is being installed for testing, exhaust gas is routed through the bypass leg 140, using valve 141 to close off exhaust flow through the test leg. Installation of device 120 is performed using two flanges 21 and 22. A sealed connection between each flange 21 and 22 is made.

Once device 120 is sealed in place, valve 141 is used to route the exhaust gas through the test leg. After the needed measurements have been made, the test parameters can be altered for additional measurements.

Upon completion of all test points of a test protocol, the exhaust gas is again routed through the bypass leg, using valve 141. The device 120 is then removed from the test system 100. Another device may then be tested using the same device installation process.

Although not explicitly shown in FIGS. 1 and 2, as explained below, in connection with FIGS. 3 and 4, system 100 may be outfitted with various rapid exchange mechanisms to allow rapid exchange of devices 120 for testing. One device 120 is exchanged for another while exhaust gas is being routed through the bypass leg 140.

Figure 3:
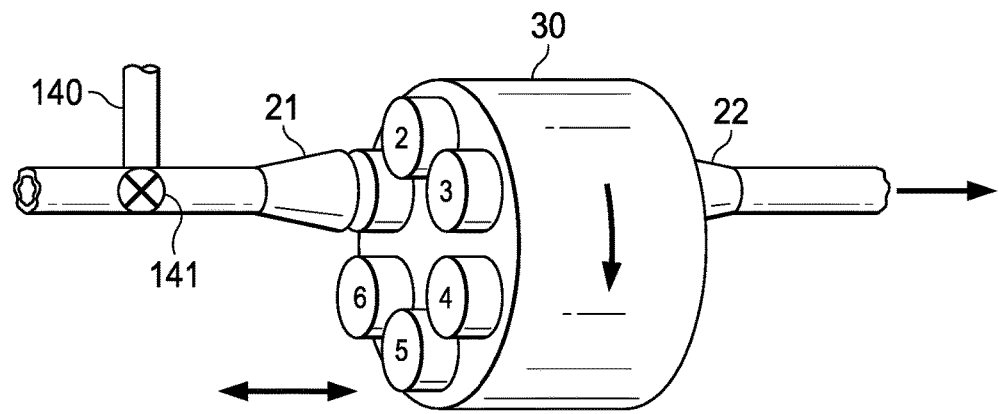
FIG. 3 illustrates the test leg equipped with a rotating drum for rapid exchange of aftertreatment devices.

FIG. 3 illustrates one embodiment of a rapid exchange mechanism 30. A rotating drum 30 has separate compartments, each compartment sized to hold a test device 120.

The drum 30 is rotated to situate each device 120 in place between flanges 21 and 22. While one device 120 is in place on the test leg and being tested, drum 30 allows other devices 120 to standby for testing or to cool and to be removed.

As indicated by the arrows, drum 30 both rotates and is movable laterally. The rotational movement selectively aligns the aftertreatment devices with the test leg. The lateral movement is parallel to the test leg. The rotation and/or the lateral movement may be manual or with a motor or other mechanism(s) (not shown).

The lateral movement of drum 30 allows the device 120 presently on the test leg to be sealed and unsealed for testing, as well as gives room for drum 30 to be rotated. Only a small lateral movement is required. It expected that the range of lateral movement may be 3 inches or less.

The sealing pressure between flanges 21 and 22 and the device 120 can be accomplished by a lateral force exerted on the device 120 by drum 30. Various spring loading features in the test leg or drum can be used to provide a sealing pressure. This lateral movement facilitates a metal-to-metal seal between test leg and the aftertreatment device.

In the example of FIG. 3, flanges 21 and 22 are used to interface device 120 to the test leg. Other sealing mechanisms and connectors may be used. A common feature is that the flanges 21 and 22 or other sealing connectors adapt the test leg diameter to the input diameter of the aftertreatment device 120.

The drum 30 is sized in thickness so that the test devices 120 protrude from each side of the drum 30, such that the connections on each side of drum 30 are to the device itself. Connections may be enhanced with the use of gaskets, such as Kalrez or graphite, to decrease the lateral load required for an acceptable seal.

Figure 4:
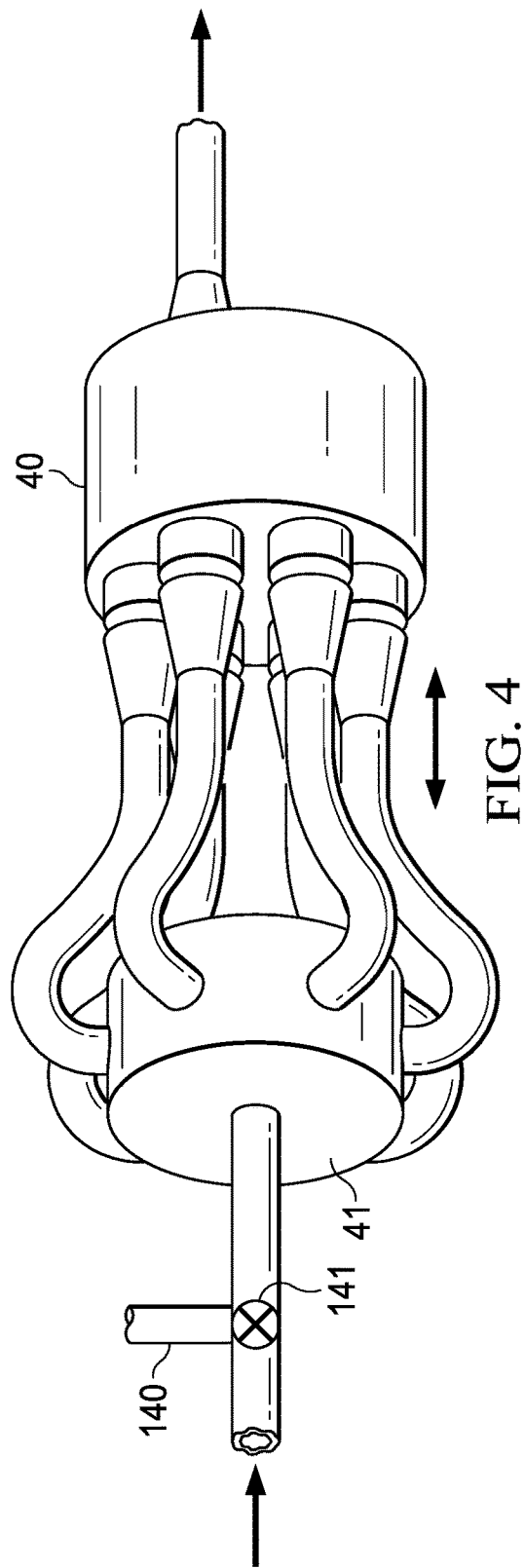
FIG. 4 illustrates the test leg equipped with a manifold and rotating drum for rapid exchange of aftertreatment devices.

FIG. 4 illustrates a second embodiment of a rapid exchange mechanism 40. Like drum 30, drum 40 has separate compartments to hold a number of test devices 120. Drum 40 moves laterally and rotates in a manner similar to drum 30.

However, in the embodiment of FIG. 4, test leg has a manifold 41 that provides a connection line to each compartment of drum 40. In this embodiment, all devices 120 are installed into their respective compartments and sealed prior to any testing of the devices.

Manifold 41 has internal valves (not shown) for routing the exhaust gas to each connection line and device 120. One device is tested, then the exhaust gas is routed to a next device 120.

A third embodiment is a modification of the assembly of FIG. 4, in which all devices 120 in drum 40 may be tested simultaneously. Each connection to a device may have a baffle or other mechanisms to adjust the pressure to each device. Once measurements have been acquired for all devices 120 in drum 40, that set of devices is unsealed and removed and a next set is installed, sealed, and tested.

Figure 5:
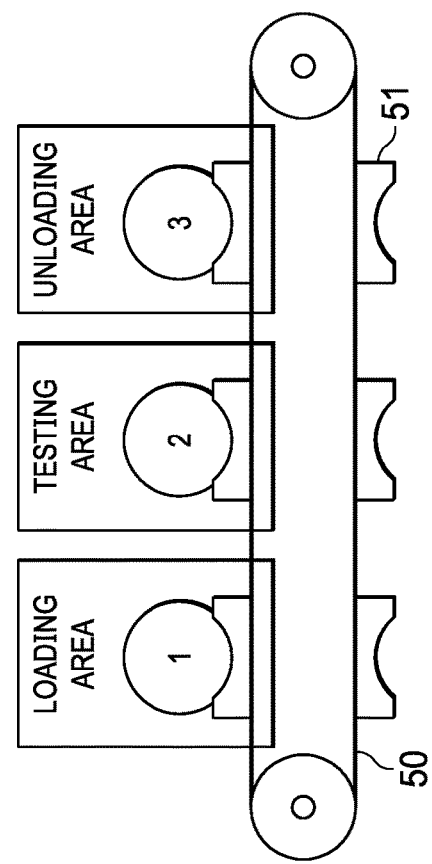
FIG. 5 illustrates the use of a conveyor belt for rapid exchange of aftertreatment devices.

FIG. 5 illustrates a rapid exchange method that does not use a rotating drum. Instead, aftertreatment devices to be tested are loaded upon a conveyor belt 50. The conveyor belt 50 has a loading area, testing area, and unloading area, each with at least one holder 51. An aftertreatment device is loaded unto the holder 51 in the loading area and conveyed to the testing area where it is sealed to the inlet gas steam of the burner-based test system 100. Once testing is completed, the device is conveyed to the unloading area and removed.

What is claimed is:

1. A method of using a burner-based exhaust replication system to rapidly test exhaust aftertreatment devices, the exhaust replication system having a test leg for delivering exhaust to an exhaust aftertreatment device and a bypass leg for bypassing exhaust around the test leg, the method comprising:

equipping the test leg with a rotating drum that holds a number of exhaust aftertreatment devices;

wherein the drum is rotatable to selectively align the aftertreatment devices with the test leg and is moveable laterally in a direction parallel to the test leg;

for testing each new aftertreatment device, performing the following steps: directing all exhaust through the bypass leg, rotating the drum to align the new aftertreatment device with the test leg; moving the drum laterally to exert pressure on the aftertreatment device thereby sealing the aftertreatment device to the test leg, directing exhaust through the test leg, testing the device in accordance with a test protocol.

2. The method of claim 1, wherein the test leg is equipped with adapter flanges that adapt the diameter of the test leg to the input diameter of the aftertreatment device.

3. The method of claim 1, wherein the aftertreatment device is further sealed to the test leg using a sealant material.

4. The method of claim 1, wherein the aftertreatment device is further sealed to the test leg using a spring loading mechanism in the test leg or the drum.

5. The method of claim 1, wherein the drum rotation or lateral movement is performed manually.

6. The method of claim 1, wherein the drum rotation or lateral movement is performed mechanically.

7. An improved burner-based exhaust replication system, the exhaust replication system having a test leg for delivering exhaust to an exhaust aftertreatment device and a bypass leg for bypassing exhaust around the test leg, the improvements comprising:
   a rotating drum that holds a number of exhaust aftertreatment devices;
   wherein the drum is rotatable to selectively align, in a series, aftertreatment devices with the test leg and is moveable laterally in a direction parallel to the test leg.

* * * * *